(12) United States Patent
Klingler et al.

(10) Patent No.: US 12,094,457 B2
(45) Date of Patent: *Sep. 17, 2024

(54) SYSTEMS AND METHODS FOR CLASSIFYING SOUNDS

(71) Applicant: Apple Inc., Cupertino, CA (US)

(72) Inventors: Daniel C. Klingler, Sunnyvale, CA (US); Carlos M. Avendano, Campbell, CA (US); Hyung-Suk Kim, Santa Clara, CA (US); Miquel Espi Marques, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/992,785

(22) Filed: Nov. 22, 2022

(65) Prior Publication Data
US 2023/0186904 A1 Jun. 15, 2023

Related U.S. Application Data

(63) Continuation of application No. 16/564,775, filed on Sep. 9, 2019, now Pat. No. 11,521,598.

(60) Provisional application No. 62/733,026, filed on Sep. 18, 2018.

(51) Int. Cl.
*G10L 15/16* (2006.01)
*G06N 3/08* (2023.01)
*G06N 20/00* (2019.01)
*G10L 25/51* (2013.01)

(52) U.S. Cl.
CPC .............. *G10L 15/16* (2013.01); *G06N 3/08* (2013.01); *G06N 20/00* (2019.01); *G10L 25/51* (2013.01)

(58) Field of Classification Search
None
See application file for complete search history.

(56) References Cited

U.S. PATENT DOCUMENTS

| | | | |
|---|---|---|---|
| 9,697,248 B1 * | 7/2017 | Ahire | G06N 5/025 |
| 2015/0294675 A1 * | 10/2015 | Hammarqvist | H04B 3/23 704/226 |
| 2017/0353790 A1 * | 12/2017 | Kim | H04R 5/027 |
| 2019/0025400 A1 * | 1/2019 | Venalainen | G06N 20/00 |
| 2019/0341035 A1 * | 11/2019 | Lee | H04L 65/612 |

* cited by examiner

*Primary Examiner* — Quynh H Nguyen
(74) *Attorney, Agent, or Firm* — Aikin & Gallant, LLP

(57) ABSTRACT

An electronic device has one or more microphones that pick up a sound. At least one feature extractor processes the audio signals from the microphones, that contain the picked up sound, to determine several features for the sound. The electronic device also includes a classifier that has a machine learning model which is configured to determine a sound classification, such as artificial versus natural for the sound, based upon at least one of the determined features. Other aspects are also described and claimed.

17 Claims, 5 Drawing Sheets

SYSTEMS AND METHODS FOR CLASSIFYING SOUNDS

This application is a continuation of pending U.S. application Ser. No. 16/564,775 filed Sep. 9, 2019, which claims the benefit of the earlier filing date of U.S. Provisional Application No. 62/733,026 filed Sep. 18, 2018.

An aspect of the disclosure relates to electronic sound classification systems and methods that digitally process microphone signals in order to discriminate between natural and artificial sounds that have been picked up in the microphone signals, for example using a machine learning model. Other aspects are also described.

BACKGROUND

Consumer electronic devices such as laptops, desktop computers, tablet computer, smart phones, and smart speakers are often equipped with virtual assistant programs that are activated in response to having detected a trigger sound (e.g. a phrase of one or more humanly audible words that may include the name of the assistant, e.g. "Hal", or other triggering speech or sounds that activate the virtual assistant to perform one or more actions). In a home environment and other environments, some sounds may originate naturally, like a person speaking or a door slamming, while other sounds originate from an artificial source like the speakers of a television or radio (also referred to as playback sounds.) It is important for the virtual assistant program to be able to discriminate between natural sounds and artificial sounds. For example, if the virtual assistant program is to alert emergency services when a person's calls for help are detected, it is important to know whether the detected speech is from a real human present in the room or whether the detected speech is part of a movie being watched in the room (e.g., to prevent false positives). Accordingly, it can be seen that a need exists for systems and methods that classify natural and artificial sounds and address other related and non-related issues/problems in the art.

SUMMARY

In one aspect, the present disclosure relates to an electronic device, such as a smart phone, smart speaker, tablet computer, laptop computer, desktop computer, networked appliance, or an in-vehicle infotainment system that includes one or more microphones and a programmed processor that implements a number of feature extractors that process the audio signals from the microphones (e.g., in parallel.) For example, the feature extractors can process audio signals (e.g., by applying algorithms or modeling to the audio signals or components thereof) to calculate, estimate, or otherwise determine the features, aspects, or characteristics. In one variation, the plurality of features can include directional information about a sound source (also referred to here as a spatial signature of the sound source), e.g., static or dynamic location, spatial covariance, etc. The plurality of features also can include sound classes or variation of sound classes, which sound classes can include a specific type of sound (e.g., speech, music, etc.). Still further, the plurality of features can include distortional features or an amount of distortional features (e.g., whether or not dynamic range compression has been applied to the audio signal.) Other features (such as sound pressure levels) are possible without departing from the scope of the present disclosure.

The programmed processor also can implement a classifier that classifies the audio signal (makes a decision) as natural vs. artificial. Natural sounds include sounds such as a person speaking, a door closing, a piano playing, etc. which have been picked up directly from their "natural" source, by the microphones. In other words, such sounds (picked up by the microphone) have originated "naturally". In contrast, artificial sounds, which are also referred to as playback sounds, are sounds that have been emitted from one or more speakers (e.g., loudspeakers of a television, a smart speaker, a laptop computer, a home entertainment video/audio system, or an in-vehicle infotainment system). In other words, they originated from an "artificial" source. The classifier employs a machine learning model, such as a neural network or other supervised learning model to provide a classification of the audio signal based on the determined features. The classifier may receive as input one or more feature vectors. A feature vector contains a specific combination of features (e.g., particular sound classes, directional information, and distortional features). For example, the determined features or feature vectors can be used as inputs for a machine learning model (e.g., a neural network) whose output may be the determined classification for the audio signal.

The classifier also may access a database that stores historical sound data (e.g., including previously stored sound metadata, which may be metadata produced by the classifier for its previously classified sounds). The historical data can be provided as one input to the machine learning model for determining a classification of the audio signal. Alternatively, in some cases, the classifier can determine the natural vs. artificial classification directly based on the historical data without waiting for the output of the machine learning model, e.g., if the features or feature vector of the current audio signal are identical or substantially similar to those of previously classified audio signals.

In another aspect, the present disclosure relates to a method for classifying sounds. The method can include providing an audio signal from a microphone to a plurality of feature extractors which are determining a plurality of features (characteristics, aspects, etc.) of the audio signal, such as directional information, sound classes or variations thereof, or distortion features. The method then can provide one or more of the determined features (or a feature vector including two or more determined sound features) to a classifier that uses a machine-learning model for determining a classification of the audio signal (e.g., to classify the audio signal as relating to a natural sound or an artificial or playback sound).

The above summary does not include an exhaustive list of all the aspects of the present disclosure. It is contemplated that the disclosure include all systems and methods that can be practiced from all suitable combinations of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

Several aspects of the disclosure are illustrated by way of example and not by way of limitation in the figures of the accompanying drawings in which like references include similar elements. It should be noted that references to "an" or "one" aspect in this disclosure are not necessarily to the same aspect, and they mean at least one. Also, in the interest of conciseness and reducing the total number of figures, a given figure may be used to illustrate features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
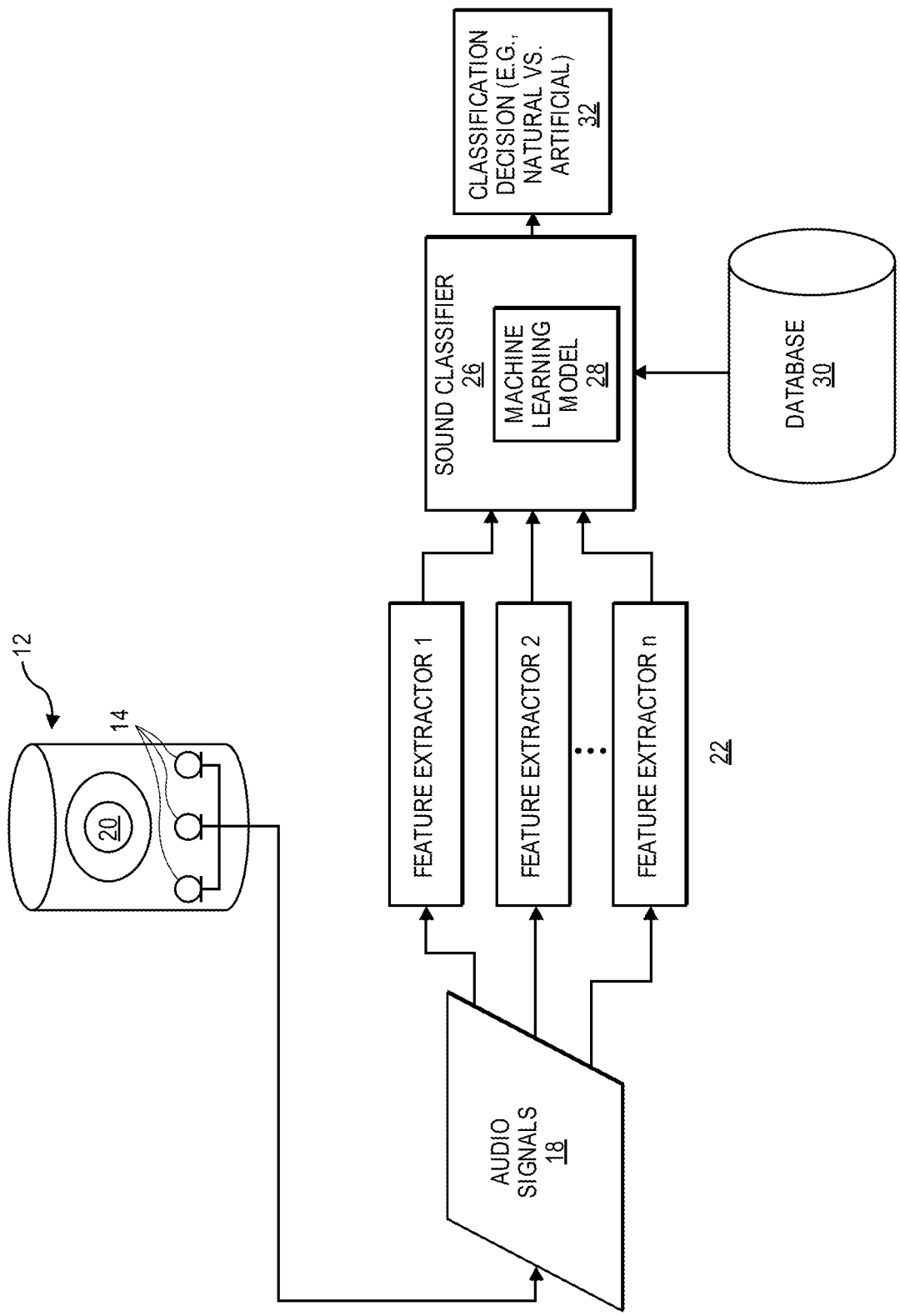
FIG. 1 illustrates a system for sound classification according to one aspect of the present disclosure.

FIG. 1 shows a system for classifying sounds signals according to one aspect of the present disclosure. The system includes an electronic device 12, such as a smart speaker as depicted in the figure, that may be executing virtual assistant software which is "always listening" for a voice trigger. The term voice trigger is used generically here as referring to any trigger sound that triggers the virtual assistant software to respond or take certain actions, not just a spoken phrase. The electronic device 12 can be any other suitable electronic device that has a software program which would have a need to discriminate between different classes of sounds that it picks up. Examples of other such devices 12 include a smart phone, tablet computer, laptop computer, desktop computer, networked appliance, or an in-vehicle infotainment system.

The electronic device 12 includes one or more microphones 14 (e.g., an array of microphones as shown) which are transducers configured to receive a sound field that is in the ambient environment of the device 12, and in response provide one or more audio signals 18 corresponding thereto (also referred to here as picked or recorded sound). The electronic device 12 further includes a processor and a memory (not shown) in which are stored various software programs, such as virtual assistant software, e.g., voice responsive artificial intelligence (AI), that, when executed by the processor will perform one or more functions or actions based upon sounds received by the microphones 14 of the electronic device 12. For example, the programs can respond via voice output through a speaker 20, to any voiced command or inquiry by a user that is picked up in an audio signal 18, or can take other actions (e.g., provide alerts, such as contact emergency services, provide notifications to a user, e.g., text messages or push notifications, etc., or perform other actions or functions, such as turn on and off devices) in response to voice inquiries, commands, or other triggering sounds. The electronic device 12 further can include a wireless communications receiver and transmitter for receiving and transmitting wireless signals (e.g., in accordance with Bluetooth protocol, Wifi wireless local area network, etc.)

As further shown in FIG. 1, the system includes a plurality of feature extractors 22 or feature extraction components or modules that may be in the form of software stored in the memory of the device 12 and that are to be executed by the processor. The feature extractors 22 are configured to digitally process the audio signals 18 so as to determine various features (aspects or characteristics) of the audio signal 18. These features may also be described as being those of the sound or sound field that has been picked up in the audio signals 18—they will be described in more detail below. Persons skilled in the art will appreciate that although FIG. 1 shows multiple feature extractors 22, the feature extraction can equivalently be performed by a single feature detection module running on device 12.

The system also includes a classifier 26 or sound classification module or component that, again as software being executed by the processor, employs or otherwise includes a machine learning model 28, such as a neural network, support vector machine, or other supervised learning model, though other statistical models and algorithms can be used without departing from the scope of the present disclosure. In addition, the system includes a database 30 that stores historical sound data or information, such as previously stored sound metadata, that can be accessed by the classifier 26. The classifier 26 determines a classification of the audio signal 18 based upon the determined features of the audio signal 18 and optionally also based on the historical sound information. In one variation, the classifier 26 makes a binary classification and determines whether the audio signal relates to a natural sound versus an artificial sound (also referred to as a playback sound). However, the classifier could also be configured to classify a sound as being one of a number of other classifications (e.g., one or more of three or more classifications) or sub-classifications, without departing from the scope of the present disclosure.

The various components or modules shown in FIG. 1, e.g., the feature extractors 22, the classifier 26, etc. of the system can include computer programmable instructions, workflows, etc. that can be stored in memory and executed or accessed by one or more processors (generally referred to as "a processor") of the electronic device 12. It should be noted that in some instances all of the components shown in FIG. 1 may be implemented inside a housing of the device 12, e.g., when there are sufficient processor and memory computing resources therein. In other instances, a form of distributed computing may be adopted where some of the components may be implemented as software that is stored remotely or in a different device and that is also executed remotely by or one or more remote processors, e.g., in a server, that is in communication with the electronic device 12 over a computer packet based network, to for example provide the classifier 26 that may be running in the device 12 access to a remotely located database 30 and a remotely located machine learning model 28.

FIG. 1 further shows that the audio signal 18 (e.g., corresponding to a sound received at the array of microphones 14 of the electronic device 12) or component or parts thereof is provided to the plurality of feature extractors 22. Each of the feature extractors 22 generally is configured to determine a specific feature, aspect, or characteristic of the audio signals by digitally processing the audio signals. The feature extractors 22 can perform specific signal processing on the audio signal to determine specific features thereof.

For example, a feature extractor 22 can apply one or more algorithms or models (e.g., including machine learning models or other supervised or unsupervised learning or statistical models) to one or more of the audio signals 18 or components thereof to estimate, calculate, or otherwise determine a specific feature, aspect, or characteristic of the audio signal.

The features determined by the feature extractors 22 include, but are not limited to, directional information (also referred to spatial signature, e.g., spatial covariance, static or dynamic sound source location, etc.), sound class features (e.g., that are indicative of sound types such as music, speech, etc.), and distortion features (e.g., whether an audio signal has been subjected to dynamic range compression, or whether any spectral characteristics show some type of artificial signature, etc.). Additional features, characteristics, aspects, information, etc. can be determined (and then used for classification of the sound), without departing from the scope of the present disclosure. For example, additional features can include sound pressure levels or other features, aspects, characteristics, or information of the audio signal.

In one aspect, the plurality of feature extractors 22 includes at least two feature extractors (e.g., one that determines sound class features and another that determines directional information), though in other aspects, the plurality of feature extractors 22 can include at least three feature extractors (e.g., one that determines sound class features, another that determines directional information, and another that determines distortion features). It will be recognized, however, that the plurality of feature extractors can include any number of feature extractors, such as four or more feature extractors, without departing from the scope of the present disclosure.

FIG. 1 further shows that the features or feature vectors determined by the plurality of feature extractors 22 are provided to the classifier module 26. As used herein, a "feature vector" is a vector of features, being defined by a plurality of specific features. An example feature vector may contain: "F1: sound class: speech; F2: directional information: dynamic location."

In one aspect, the determined features can be used as inputs for the machine learning model 28, e.g. inputs for a neural network or other supervised learning model. Accordingly, based upon the determined features or feature vectors, the classifier 26 can employ machine learning to determine a classification 32 of the audio signal (e.g., whether the sound is natural vs. artificial).

The classifier 26 may also access or otherwise receive historical sound data or information (e.g., including previously stored sound metadata) from the database 30, and can determine a classification of the audio signals 18 based on this historical sound data or information (in addition to an input feature vector). For example, the historical data can be used as one or more inputs for the machine learning model 28. However, if the classifier 26 determines that an input feature vector is similar to one or more features of audio signals that were previously classified (e.g., as natural vs. artificial), then the classifier 26 can execute a shortcut (e.g., bypassing application of the machine learning model 28) and determine the classification directly based on the historical data.

It should be understood that each time the classifier 26 determines a correct classification for an audio signal, e.g., based on specific features or a specific feature vector, then information related to the correctly classified audio signal, e.g., including a labeled feature vector or labeled features, can be provided to the database 30 for storage therein and for use in subsequent attempts at classifications.

In some instances, the classifier 26 can be configured determine whether the audio signal includes any embedded signals, or whether the electronic device has received any out-of-band signals, e.g., Bluetooth® or Wifi signals, which indicate that the sound captured in the audio signal is originating from a loudspeaker in another device (that may be within the same sound field as the device 12). For example, other electronic devices, such as other electronic devices that are part of the same ecosystem of the electronic device 12 or are manufactured by the same manufacturer of the electronic device 12, may be configured to transmit an embedded or in-band signal (e.g., embedded in the sound emitted from the loudspeaker), or an out-of-band signal (e.g., in a Bluetooth signal or a Wifi or other wireless RF communication signal) to indicate to the system or any recipient of that signal, that it is emitting sound. Accordingly, if such a signal is received by the device 12 and provided to the classifier 26, then the latter can execute a shortcut to classify the sound as an artificial (playback) sound.

Figure 2:
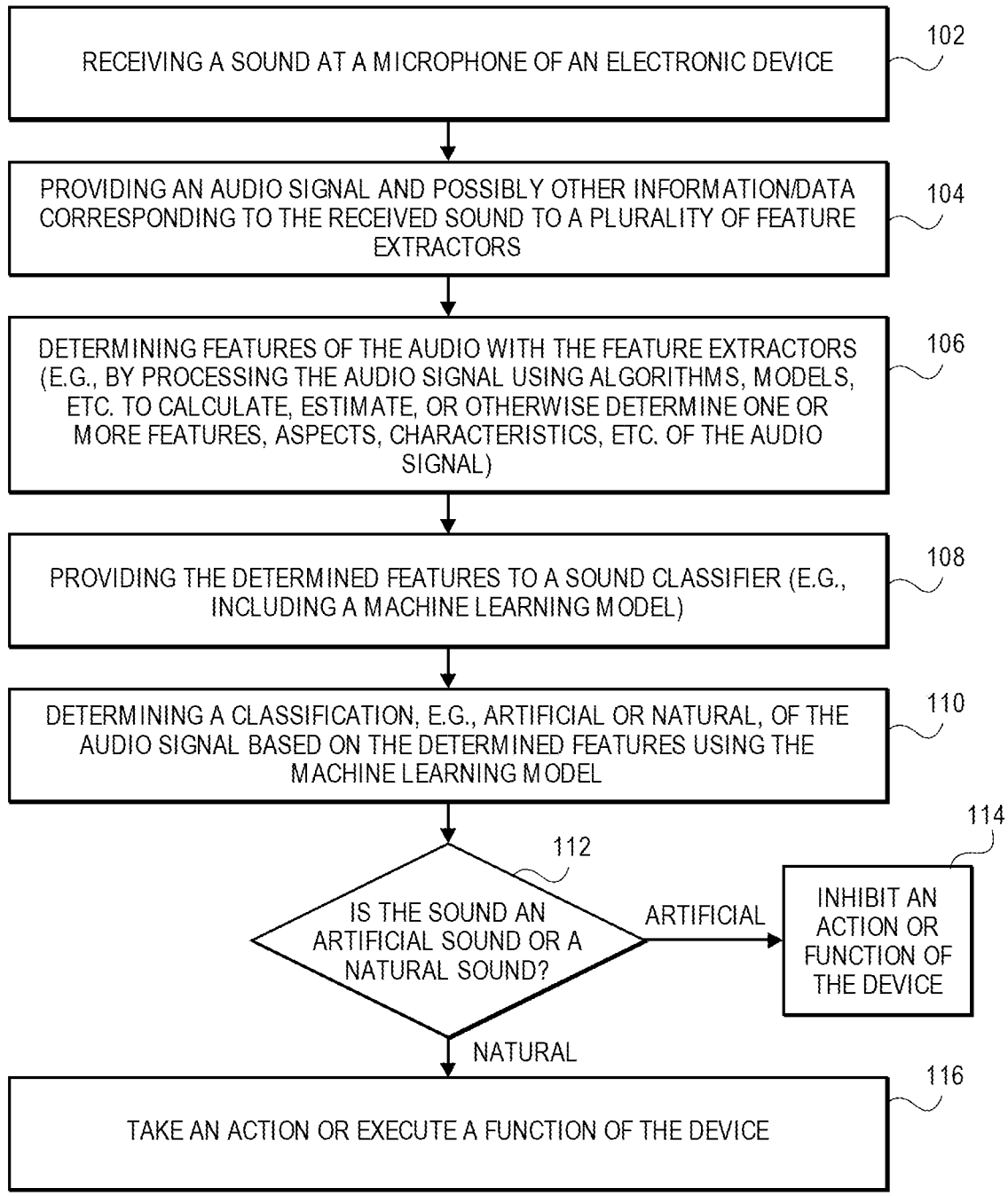
FIG. 2 provides a flow diagram of a method or process for classifying sounds according to one aspect of the present disclosure.

FIG. 2 shows a flowchart for a method or process for sound classification according to one aspect of the disclosure. As shown in FIG. 2, at action 102, a sound is received at the electronic device (e.g., the sound is received by a microphone (or microphones) of the electronic device 12). At action 104, an audio signal (e.g., an audio waveform provided by one or more of the microphones 14 and corresponding to or responsive to the received sound) is provided to one or more feature extractors. At action 106, one or more feature extractors determine features of the audio signal (e.g., including directional information, a sound class or variation thereof, and distortion features). The determined features then are provided to a classifier such as a machine-learning model (e.g., a neural network) at action 108. The machine-learning model determines a classification, e.g., whether the sound is artificial vs. natural, based on the determined features (at action 110). In one variation, if it is determined that the sound is an artificial sound at action 112, the electronic device may be prevented from performing one or more actions or functions (at action 114). However, if it is determined that the sound is a natural sound, the electronic device may be allowed to take one or more actions or execute a function (at action 116).

For example, the electronic device may be programmed or otherwise configured to notify emergency services such as police, fire department, or a security firm, if a call or yell for help is received. Accordingly, if audio signals that contain a recorded call for help are determined to be a natural sound (i.e., directly spoken by a real human), the electronic device may take steps to notify emergency services. However, if the audio signals related to a call for help are determined to be artificial or play back sounds (e.g., a person in a podcast or a movie calling for help), the electronic device will take no action to contact emergency services.

The electronic device further may also be programmed to provide emergency notifications to a user or a home security system if a specific natural sound is received (e.g., breaking glass, a garage door opening, etc.). Thus, if the audio signals related to these specific sounds, such as breaking glass, or a garage door opening are determined to be natural sounds, the electronic device may provide the emergency notification, but if the specific sounds are determined to be artificial or playback sounds (e.g., as part of a television broadcast that is being played back), the electronic device will not provide the notification (e.g., to prevent bothersome false notifications). Similarly, the electronic device may be programmed to act as a baby monitor and provide certain notifications or alerts if specific baby sounds are received (e.g., sounds of a baby crying or sounds indicating that the baby is sleeping) but only if it has also determined to them be natural sounds—that is, the electronic device will not provide such notifications if the audio signals are determined to be artificial.

A virtual assistant may also collect information based on specific sounds, e.g., it may add a calendar appointment when a person says they will "meet X for dinner", or the virtual assistant may log sounds indicating bad reactions when a user is displeased with a response by the virtual assistant. The virtual assistant thus may log such information or take certain actions only when the audio signals are determined to be natural, and will not log such information, or delete certain information, or take certain actions when the audio signals are determined to be artificial or playback sounds.

The electronic device and in particular a voice assistant program running in the device may also take one or more actions when audio signals are determined to be artificial. For example, the electronic device may be programmed to turn down the volume on a television in response to determining that its received sound indicates that a commercial has just started playing, and then return the volume to its previous level in response to determining that its received sound indicates that the commercial has ended. In such a context, the electronic device will take such action only if it has determined that the audio signals relating to the sounds are artificial or playback sounds (i.e., sounds coming from the television rather than just sounds from real people in the room talking or playing music through a real musical instrument).

As another example, the electronic device (and the virtual assistant program) may make media recommendations based on detecting and interpreting people's reaction to currently playing media. In this context, the device will need to discriminate between audio signals that contain natural sounds (e.g., positive or negative reactions of a real person in the room) vs. audio signals that contain artificial sounds (e.g., outbursts or commentary by people in currently playing media, such as a radio or television broadcast or commercial).

Figure 3:
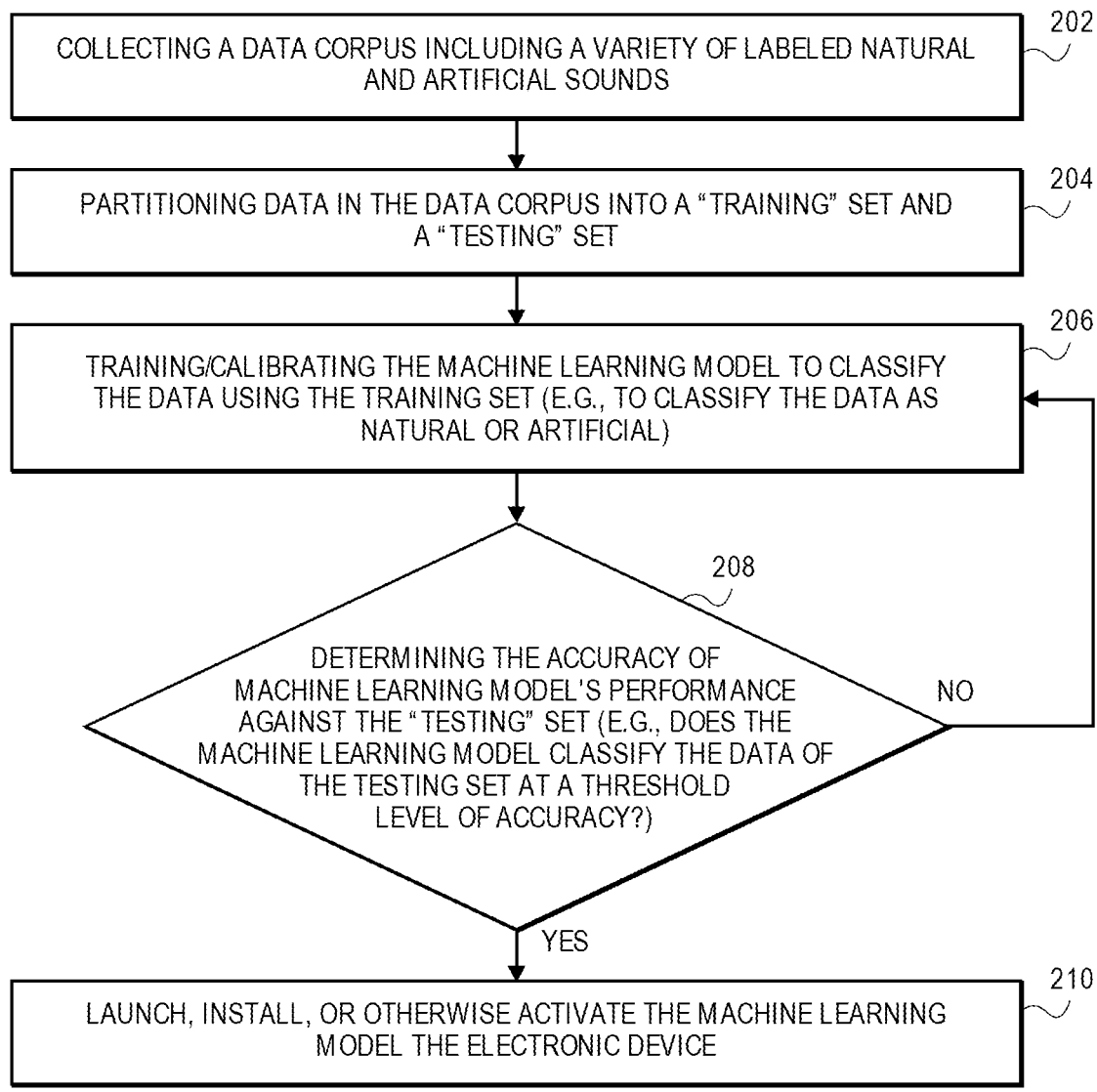
FIG. 3 provides a flow diagram of a method or process for training or calibrating a machine learning model for sound classification according to one aspect of the present disclosure.

FIG. 3 shows a flow diagram for a method or process for training of the machine learning model. As shown in FIG. 3, at action 202, a data corpus including a variety of labeled natural and artificial sounds can be collected. At action 204, the data corpus is partitioned or otherwise separated into a training set and a testing set. Thereafter, at action 206, the training set is applied to the machine learning model to calibrate or otherwise train the machine learning model to learn to classify the data of the training set (e.g., to classify the audio data as natural vs. artificial). A human being may have indicated the ground truth, e.g., which portions of the training set were natural sounds vs. which were artificial sounds. At action 208, the accuracy of the machine learning model's performance is determined. For example, it is determined whether the machine learning model classifies the audio data of the testing set at a threshold rate of accuracy.

If the model's performance does not meet the threshold level of accuracy when compared to this ground truth, the process or method returns to action 206 and the model is further trained or calibrated using the training data (or other additional training data). However, if the threshold level of accuracy is met, the machine learning model can be launched, installed, or otherwise activated on the electronic device (at action 210).

Figure 4:
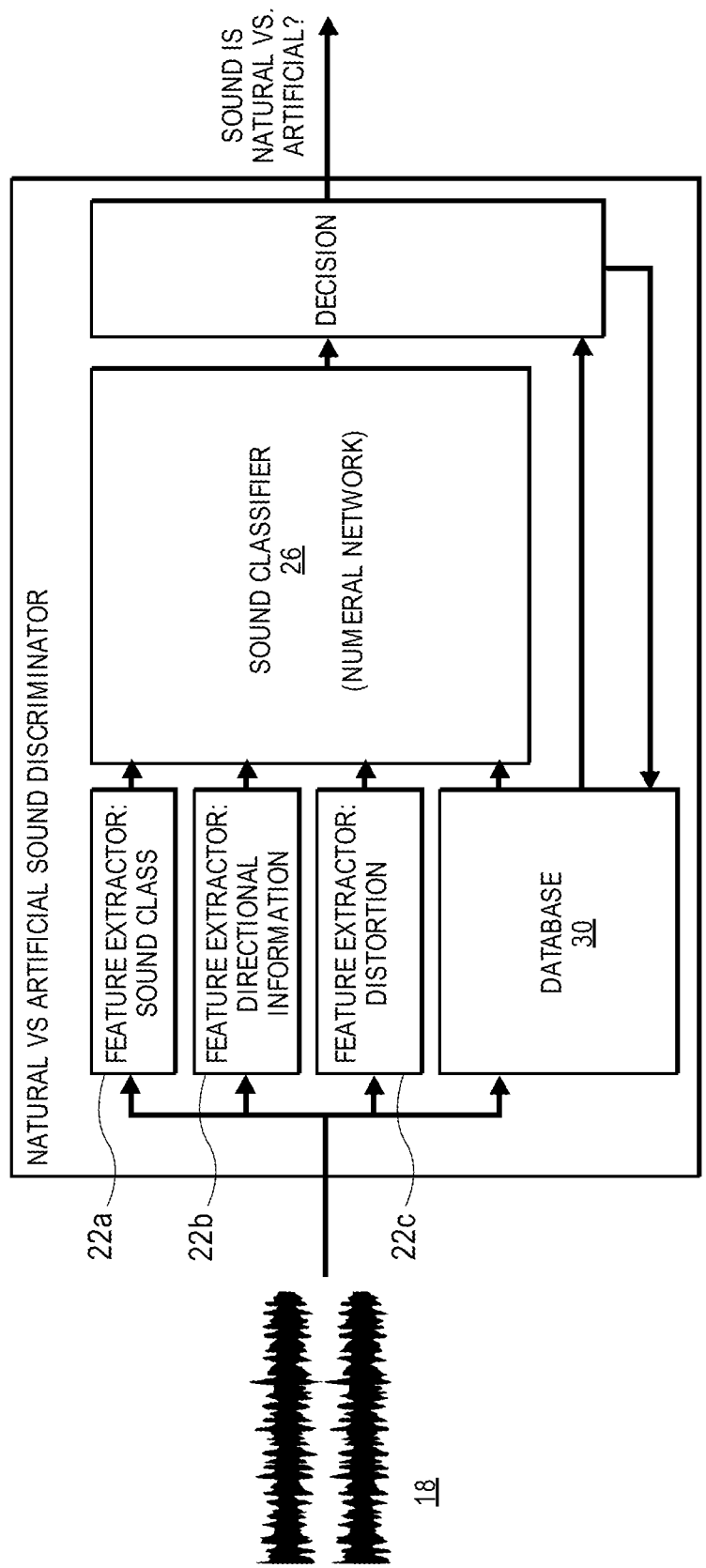
FIG. 4 shows a system for classifying sounds as artificial versus natural according to one aspect of the present disclosure.

FIG. 4 shows a sound discrimination system for classifying audio signals (based on the recorded sounds therein) according to one aspect of the present disclosure. As shown in FIG. 4, the system can include a plurality of feature extractors 22 or one or more feature extraction or detection components or modules that perform specific signal processing on received audio signals 18 to determine specific features, aspects, or characteristics thereof. The plurality of feature extractors 22 can apply algorithms or modeling (e.g., including machine learning modeling) to the audio signals (e.g., components thereof) to determine their specific features. The plurality of feature extractors 22 includes a sound class feature extractor 22a, a directional information feature extractor 22b, and a distortion feature extractor 22c.

In one variation, the sound class feature extractor 22a can apply one or more algorithms or models to the audio signals 18 to determine one or more sound classes present in one or more of the audio signals 18. The sound classes can include a specific sound type, such as speech, music, laughter, cheering, explosions, sounds made by particular objections (e.g., doors opening and closing), etc., or other types of sounds. In addition, the sound class feature extractor 22a can determine whether the audio signals include multiple sound classes or whether the sound classes vary or change over time. For example, devices that produce artificial or playback sounds, such as televisions, tablets, radios, etc., generally emit sounds having multiple sound classes that vary or change more frequently with time (e.g., a news broadcast may include music, speech, cheering, etc. that will vary throughout the news broadcast—that is the news broadcast will have speech then music then speech or other sounds over for example a five minute interval). In contrast, natural sounds, such as speech from a real person in the room or music from a musical instrument, generally include the same sound class that changes less frequently (e.g., no changes over a five minute interval).

The sound class feature extractor 22a itself can include one or more machine learning models or other supervised learning or statistical models that are trained or calibrated to determine the different sound classes, respectively, based on the audio signal 18 as its input. For example, a data corpus including a variety of ground truth labeled sounds of different sound classes is collected. The data corpus can then be partitioned or otherwise separated into training sets and testing sets. The machine learning model is trained or calibrated to determine the sound class or sound classes using the training set. The accuracy of the machine learning then can be determined using the testing set, e.g., to determine whether the machine learning model assigns classes to signals of the testing set at a threshold rate or level of accuracy.

Further, in one variation, the plurality of feature extractors 22 can include a directional feature extractor 22b. The directional feature extractor 22b can perform signal processing on one or more of the audio signals 18 to determine spatial signatures or characteristics, e.g., there is a dynamic sound source vs. a static sound source recorded in the audio signals 18. For example, an audio signal that contains a recording of a sound emitted from a stationary device (e.g., a television, a smoke detector, a loudspeaker that is built into a wall or ceiling) may have stationary or static spatial characteristics, but an audio signal from a sound of a person talking or yelling may have dynamic spatial characteristics due to the person turning their head or walking around (while talking or yelling). The directional feature extractor can process the audio signal to determine directional characteristics of the sound such as a specific direction, time of arrival, angle, etc. For example, sounds emitted from a television or other stationary electronic device will generally be received from the same position and will have the same or similar directional characteristics reflected in the audio signal.

Additionally, the directional feature extractor 22b could also process the audio signals 18 to determine a spatial correlation or spatial covariance thereof, e.g., using known algorithms or modeling. For example, different audio signals received from the various microphones 14 can be processed to determine time direction of arrival characteristics of a sound recorded in the audio signals. Here, it should also be noted that a single audio signal from a single microphone could be processed to determine a direct portion, an early reflection portion, or a reverberation portion of a recorded sound therein, and such characteristics of the audio signal could be used to determine or estimate a directional characteristic of that recorded sound. Alternatively, multi-channel techniques (for processing multiple audio pickup channels from multiple microphones contemporaneously) such as blind source separation could be used to directly compute the directional characteristics of the recorded sound source.

Still further, the plurality of feature extractors 22 can include a distortional feature extractor 22c. In one variation, the distortional feature extractor 22c can process the audio signals 18 (e.g., by applying known algorithms or models) to determine spectral characteristics thereof. For example, many artificial sounds have a specific bandpass characteristic, which contains a smaller set of frequencies (spectral components) than those present in natural speech, at least because speakers that are commonly present in consumer electronic devices such as laptop computers, desktop computers, televisions, radios, etc. tend to produce low frequencies poorly, and in some cases high frequencies are also produced poorly. Also, loudspeakers often generate harmonic distortion patterns that may be detectable. In other cases, the recorded sound from a loudspeaker that is playing back a decoded audio program contains detectable distortion due to communication channel encoding and decoding, bit rate reduction compression and decompression, and certain noise signatures.

The distortional feature extractor 22c could also process one of the audio signals 18 (e.g., using known algorithms or modeling) to determine an amount of compression, e.g., dynamic range compression, or another measure of distortion of the audio signal. For example, many artificial or playback sounds contain audio compression due to audio processing (e.g., dynamics processing on a broadcast stream) commonly applied to news broadcasts, movies, music, etc. Such compression is not found in natural sounds, such as a person speaking, a dog barking, a door slamming, etc.

As further shown in FIG. 4, the natural versus artificial sound discriminator also includes a database 30 which has stored therein historical sound data, such as previously stored sound metadata. The database 30 can include metadata or other information related to or describing previous sounds that have been classified by the natural versus artificial sound discriminator.

The natural versus artificial sound discriminator includes a classifier 26, employing a neural network or other suitable machine or supervised learning, whose output may be a natural vs. artificial decision. The classifier 26 receives the plurality of features, as well as previously stored sound metadata. For example, these features and the historical data can be used as inputs to the neural network, which can make a decision on whether the sound is natural vs. artificial. Note that, in some cases, the decision made by the classifier 26 (to determine whether the audio signal is from a natural sound vs. an artificial sound) can be based on just the historical data without relying upon an output of the neural network (e.g., if the current audio signal has substantially similar features or the same feature vector as those of a previously classified audio signal.)

Figure 5A:
FIGS. 5A-5C show example diagrams of sound classification for various sounds using a system for sound classification according to one aspect of the disclosure.
Figure 5B:
Figure 5C:
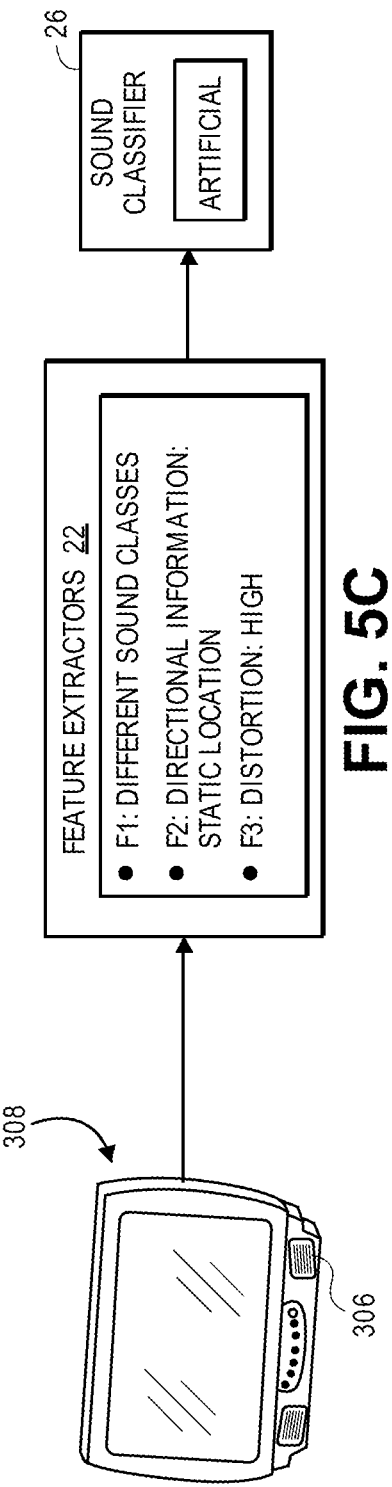

FIGS. 5A-C show a diagram for determining classification of example sounds using the system of FIG. 4. For example, FIG. 5A shows classification of audio signals related to sounds generated directly from a person 302 speaking. FIG. 5B shows classification of audio signals related to sounds from a musical instrument 304 (e.g., a piano) playing. FIG. 5C shows classification of sounds from speakers 306 of a television 308. The sounds are recorded by a microphone of the electronic device and corresponding audio signals can be provided to the feature extractors 22 for processing to determine the specific features or feature vectors of the audio signals. These features or feature vectors can be provided to the classifier 26, which can apply machine modeling to the features or feature vectors, to make a decision on how to classify the sounds (e.g., as natural vs. artificial).

As shown in FIG. 5A, audio signals that have recorded therein the sounds that are generated directly from the person 302 speaking will have the same sound class feature (F1: sound class: speech) as determined by the feature extractor 22a, and this sound class feature will generally not change or vary over a certain time interval, e.g., five minutes. For example, it will be understood that the audio spectral bandwidth of the audio signals (directly from the person 320 speaking) matches that of natural speech, and the audio signals further are not compressed and have statistics of natural speech. Further, the directional information of such sounds (the person speaking) includes dynamic location aspects or characteristics (e.g., because the position of the person's mouth generally will change as the person is speaking, such as when the person turns their head or walks around the room). This feature (F2: directional information: dynamic location) is determined by the feature extractor 22b. Still further, the sounds generated directly from the person 302 speaking will not include large amounts of distortional features (e.g., specific noise, compression, channel aspects, etc.) common in most artificial sounds. This feature (F3: distortion: low) is determined by the feature extractor 22c. Accordingly, based on this specific sound feature vector (e.g., F1: sound class: speech, F2: directional information: dynamic location, and F3: distortion: low), the classifier 26 can determine that the audio signals related to the person 302 are from a natural sound source. Furthermore, if available a speaker identification module (not shown) may be executed upon the audio signals which, once trained, can indicate whether or not the person 320 is a member of the household (making it more likely the natural classification decision made at the output of the classifier is the right one.)

FIG. 5B shows another example of a natural sound source, this time producing not speech but rather music, from a piano 304. Here, the feature extractor 22a generates F1: sound class: music (the sound class feature for audio signals that are related to sounds from a musical instrument) that does not vary or change (e.g., over a certain time interval such as five minutes.) In addition, and in contrast to speech, the directional information in this case refers to a static location (e.g., because the position of the piano generally will not change or vary). Also, similar to speech, the feature extractor 22c generates F3: distortion: low (as the sounds generated the piano 304 will not include large amounts of distortional features, e.g., specific noise, compression, channel aspects, etc. because the piano 304 is not being played through a sound reproduction system). Accordingly, based on this specific feature vector (e.g., F1: sound class: music that does not vary; F2: directional information: static location; and F3: distortion: low), the classifier 26 can determine that these audio signals relate to a natural sound. Even though the positional information is static in this case (which generally may be true for most types of artificial sounds, such as for large electronics, e.g., a television 308 discussed below), the classifier 26 will determine that F2: static location in combination with a fairly steady or unchanging F1: sound class: music, as well as low amounts of distortion (F3: distortion: low), indicates that the audio signals are picking up a natural sound.

Turning now to FIG. 5C, this figure shows another commonly found sound source, namely a television 308. The audio signals related to sounds from the television 308 have been processed by the feature extractor 22a, resulting in a feature F1: different sound classes (e.g., music, voices, explosions, laughter, etc.) This is in contrast to the single sound class feature that was determined for speech by the person 302, and for music by the piano 304. Similar to what it determined for the piano 304, the feature extractor 22b (directional information extractor or spatial signature extractor) determines F2: directional information: static location, for the spatial signature of the television audio signals (e.g., as the television will generally remain in the same position in the room). In this case, the output of the third feature extractor 22c (distortion extractor) indicates large or high amounts of certain types of distortion, e.g., dynamic range compression (i.e., features extractor 22c will determine F3: distortion: high). Additionally, or alternatively, the classifier 26 in this case may recognize (e.g., based on accessing the database 30) that a high variety of TV-like sounds (cars driving, humans speaking, music, sporting events) have been previously detected by the feature extractor 22a that coincide with that a particular spatial signature (static location) for which a classification decision was previously made by the classifier 26.

If the spatial signature for the current audio signals, which have F1: different sound class, matches a direction of arrival stored in the database that is also associated with both F1: different sound class, F2: directional information: static location, and F3; distortion: high, then the classifier 26 could infer that the current audio signals having the feature vector F1: Sound class: Different sound classes that change or vary;
F2: directional information: static location;
F3: distortion: high are related to sounds from a particular type of artificial sound source, e.g., a television 308, and the audio signals are therefore classified as being from an artificial or playback sound source.

As described above, one aspect of the present technology is the gathering and use of data available from various sources to classify sounds and to improve the accuracy of classifying sounds. The present disclosure contemplates that in some instances, this gathered data may include personal information data that uniquely identifies or can be used to contact or locate a specific person. Such personal information data can include demographic data, location-based data, telephone numbers, email addresses, TWITTER ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to classify sounds to improve the performance of a virtual assistant software program.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of continuous audio collection ("always listening") and storage of historical sound data, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, sound classification can be performed based on non-personal information data or a bare minimum amount of personal information, such as the content being requested by the device associated with a user, other non-personal information available to the sound classification system, or publicly available information.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While certain aspects have been described and shown in the accompanying drawings, it is to be understood that such are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

What is claimed is:

1. An electronic device, comprising:
   one or more microphones configured to receive a sound; and
   a processor and memory having stored therein a plurality of instructions that when executed by the processor implement:
   at least one feature detector configured to receive one or more audio signals from the one or more microphones that comprise the sound, and process the one or more audio signals to i) detect whether a sound source has dynamic location or static location, ii) detect whether the sound source is producing music or speech as a sound class, and iii) determine a third feature, wherein the third feature is whether the sound class is varying between music and speech more frequently over time versus less frequently over time; and
   a sound classifier including a machine learning model that is configured to determine whether the sound is generated by a speaker based upon i) the at least one feature detector having detected whether the sound source has dynamic location or static location, ii) the at least one feature detector having detected whether the sound source is producing music or speech, and iii) the third feature.

2. The electronic device according to claim 1, wherein the electronic device performs one or more functions or actions based upon the sound classifier having determined whether the sound is generated by the speaker.

3. The electronic device according to claim 1, wherein if the sound classifier determines that the sound is not generated by the speaker, then the device is allowed to perform one or more actions or functions based on the sound, and wherein if the sound classifier determines that the sound is generated by the speaker, the device is prevented from performing those one or more actions or functions based on the sound.

4. The electronic device according to claim 1, wherein the at least one feature detector detects whether dynamic range compression has been applied to the one or more audio signals, and the sound classifier determines whether the sound is generated by the speaker based on the at least one feature detector having detected whether dynamic range compression has been applied.

5. The electronic device according to claim 1, wherein the sound classifier includes a neural network.

6. The electronic device according to claim 1, wherein the device is a smart phone, a smart speaker, a tablet computer, a laptop computer, or a desktop computer.

7. The electronic device according to claim 1, wherein the sound classifier accesses a database that stores historical sound data, and wherein the sound classifier determines whether the sound is generated by the speaker based upon the historical sound data.

8. The electronic device according to claim 1, further comprising:
   a wireless communications receiver configured to receive a signal from an additional electronic device indicating that the sound originated from a loudspeaker of the additional electronic device, wherein the sound classifier determines whether the sound is generated by the speaker responsive to the signal.

9. An electronic device, comprising:
   a plurality of microphones configured to produce a plurality of audio signals in response to receiving a sound;
   at least one feature detector configured to receive the plurality of audio signals from the plurality of microphones, and i) detect whether a sound source has dynamic location or static location, ii) detect whether the sound source is producing music or speech as a sound class, iii) detect whether dynamic range compression has been applied to one or more of the plurality of audio signals, and iv) detect whether the sound class is varying between music and speech more frequently over time versus less frequently over time; and
   a classifier including a machine learning model that is configured to determine whether the sound is generated by a speaker based upon a) the at least one feature detector having detected whether the sound source has dynamic location or static location, b) the at least one feature detector having detected whether the sound source is producing music or speech, c) the at least one feature detector having detected whether dynamic range compression has been applied in one or more of the plurality of audio signals, and d) the at least one feature detector having detected whether the sound class is varying between music and speech more frequently over time versus less frequently over time,
   wherein the electronic device performs one or more functions or actions based upon the classifier having determined whether the sound is generated by the speaker.

10. The electronic device according to claim 9, wherein the sound classifier includes a neural network that receives as input all of the plurality of audio signals and produces as output the detections in i)-iv).

11. The electronic device according to claim 9, wherein the device is a smart phone, a smart speaker, a tablet computer, a laptop computer, or a desktop computer.

12. The electronic device according to claim 9, wherein the classifier accesses a database storing historical sound data, and wherein the classifier determines whether the sound is generated by the speaker based upon the historical sound data.

13. A method performed by a processor of an electronic device for discriminating between two classes of sounds, comprising:
- capturing a sound using a plurality of microphones, as a recorded sound;
- digitally processing the recorded sound to determine at least three features of the recorded sound that include detecting whether a sound source has dynamic location or static location, detecting whether the sound source is producing music or speech as a sound class, and detecting whether the sound class is varying between music and speech more frequently over time less frequently over time;
- determining using a machine learning model a classification of the sound based on the at least three features, the classification being whether the sound is generated by a speaker; and
- performing a virtual assistant action based upon the classification.

14. The method according to claim 13, wherein the sound classifier includes a neural network.

15. The method according to claim 13, further comprising:
- accessing a database that stores historical sound data; and
- determining the classification of the recorded sound based upon the historical sound data accessed from the database.

16. The method according to claim 13, further comprising:
- receiving a signal from an additional electronic device wherein the signal indicates that the sound originated from the additional electronic device; and
- in response to the signal, determining the classification as being the sound is generated by the speaker.

17. The method according to claim 13, wherein the sound classifier includes a machine learning model, the method further comprising training the machine learning model by:
- collecting a data corpus including a variety of labeled natural and artificial sounds;
- partitioning a data in the data corpus into a training data set and a testing data set;
- calibrating the machine learning model to classify the data using the training data set; and
- determining accuracy of the machine learning model using the testing data set.

* * * * *